United States Patent
Pikkujämsä

[11] Patent Number: 5,246,680
[45] Date of Patent: Sep. 21, 1993

[54] PROCESS FOR DESULFURIZATION OF FLUE GASES

[75] Inventor: Esa Pikkujämsä, Tampere, Finland

[73] Assignee: Tampella Power Oy, Tampere, Finland

[21] Appl. No.: 794,257

[22] Filed: Nov. 19, 1991

[30] Foreign Application Priority Data

Dec. 28, 1990 [FI] Finland .................................. 906447

[51] Int. Cl.$^5$ .......................... B01J 8/00; C01B 17/00
[52] U.S. Cl. .......................... 423/244.07; 423/243.01; 423/243.08
[58] Field of Search .......... 423/242 A, 242 R, 512 A, 423/243.01, 244.07, 243.08

[56] References Cited

U.S. PATENT DOCUMENTS

| | | | |
|---|---|---|---|
| 4,081,513 | 3/1978 | Moss | 423/242 |
| 4,559,211 | 12/1985 | Feldman et al. | 423/242 |
| 4,600,568 | 7/1986 | Yoon et al. | 423/244.07 |
| 4,604,269 | 8/1986 | Yoon | 423/244.07 |
| 4,753,785 | 6/1988 | Kisters | 423/242 |

*Primary Examiner*—Gregory A. Heller
*Attorney, Agent, or Firm*—Banner, Birch, McKie & Beckett

[57] ABSTRACT

Process and apparatus for removal of sulfur oxides from flue gases.

In the process, a NaOH solution is injected into flue gases containing calcium oxide so that the formed reaction products are discharged from the reactor in a dry dust-like form together with the flue gases, whereafter the solids present in the flue gases are separated from the flue gases, mixed with water and sodium so as to form a sodium hydroxide solution wherefrom the other reaction products in solid form can be removed, the sodium hydroxide solution being returned to the flue gases.

The apparatus comprises a desulfurization reactor (3) wherein a sodium hydroxide solution is injected into the flue gases, and an electrostatic precipitator (5) wherein the dust-like solids are separated from the flue gases. The apparatus further comprises a mixing reactor wherein the solids are mixed with water and additional sodium, and a filter (10) wherein the solids produced in the reaction are separated from the formed NaOH solution which is returned to a nozzle (11a) for injection into the reactor (3).

9 Claims, 1 Drawing Sheet

PROCESS FOR DESULFURIZATION OF FLUE GASES

This invention relates to a process for the removal of sulfur oxides from flue gases, wherein lime which reacts with the sulfur oxides forming a solid dust-like reaction product is fed into the flue gases, and wherein water is injected into the calciferous flue gases still containing sulfur oxides to enhance the reaction, and the dust-like solids resulting from the reaction are removed from the flue gases with a filter.

Furthermore, the invention relates to an apparatus for carrying out the process, which apparatus comprises a reactor whereinto the calciferous flue gases are conveyed, means for injecting water into the flue gases and a filter for removing the dust-like solids from the flue gases.

When different fuels, such as typically coal or oil, are burned in power boilers, the sulfur contained therein forms various oxides and other combinations of sulfur in connection with the combustion, and these are normally environmentally harmful. Sulfur dioxide is produced in the largest quantity, the formation of which one has tried to eliminate by different combustion-technical means. Typically, the removal of sulfur oxides has been effected by mixing lime with the flue gases in order to produce a reaction between the sulfur compounds and the lime and thereby to make the gaseous sulfur compound to convert to a solid compound of sulfur and lime. Desulfurization processes based on lime can as such be divided into wet, semi-dry and dry processes, depending on their operation. In dry processes, lime is supplied to the boiler, whereupon part of the sulfur oxides react in the boiler and, to some extent, subsequently in the flue gas conduit, but the efficiency of the desulfurization is rather poor in a solution of this kind, and furthermore it is necessary to use a large quantity of lime to attain even an adequate operating efficiency. In semi-dry processes, lime is injected into the flue gases after the boiler in the form of a slurry or solution, so that on account of the heat of the flue gases, the final result is a dry dust-like reaction product. In wet cleaning processes, the flue gases are again conducted through a lime slurry, in which connection sulfur dioxide reacts with the lime contained in the slurry. The cleaning result as such is good, but the handling and purification of the lime slurry require expensive and complex equipment and the use of such equipment is troublesome and expensive.

Further, there is a dry - semi-dry desulfurization process wherein lime is injected into the boiler or a separate reactor after the boiler, and thereafter water is separately injected thereinto to convert calcium oxide to calcium hydroxide and to produce a reaction between the sulfur and the calcium hydroxide. The process is simple and easy to carry out technically, but its desulfurization capacity does not come up to the level of the most rigid desulfurization regulations, and therefore it cannot be applied in all conditions. Likewise, in this solution one has to use a relatively high Ca/S ratio to accomplish the desired reduction, which increases the operating costs.

Also the so called dual alkali process, known e.g. from U.S. Pat. Nos. 3 520 649 and 4 452 766 and EPA publication "Summary Report: Sulfur Oxides Control Technology Series: Flue Gas Desulfurization Dual Alkali Process", October 1980, has been used for desulfurization.

U.S. Pat. No. 4 452 766 and the EPA publication disclose a solution wherein the flue gases are conveyed into a gas scrubber in which a solution containing sodium compounds is injected into the flue gases. The solution containing sodium compounds reacts with sulfur dioxide, forming e.g. sodium sulfite and sodium sulfate which are entrained in the solution as it flows down to the lower portion of the scrubber and further therefrom into a mixing reactor. In the mixing reactor, lime is mixed with the solution that has discharged from the scrubber, whereafter the produced solution—lime admixture is conveyed into a thickening apparatus. The lime generates a reaction which produces an alkaline solution containing solid calcium compounds and sodium compounds. In the thickening apparatus, fly ash and the produced calcium sulfate are separated from the alkaline solution which is recycled to the scrubbing tower to be injected.

The process of U.S. Pat. No. 3 520 649 is also based on a scrubber and is otherwise similar to that disclosed above except that lime is also supplied to the boiler.

The object of this invention is to provide a process and an apparatus for the removal of sulfur compounds from flue gases, wherewith effective cleaning of the flue gases is achieved and which is uncomplicated to realize. The process of the invention is characterized in that water is supplied to the flue gases as a sodium-containing alkaline solution, whereupon sodium will react with sulfur oxides so that the reaction produces dust-like solids, that at least water and sodium are mixed with the dust-like solids separated from the flue gases so as to form an admixture wherein lime, sulfur and part of the sodium react, forming new solid reaction products, and the remainder of the sodium forms sodium hydroxide with the water, that the solids are filtered from the produced admixture and that at least part of the sodium hydroxide solution in the form of a filtrate is recycled for injection into the flue gases. The apparatus of the invention is again characterized in that it comprises a mixing tank wherein the separated solids are mixed with water and sodium into a blend, a filter for filtering the produced solids from the obtained alkaline solution containing sodium hydroxide, and means for conveying at least part of the sodium hydroxide solution into the reactor for injection.

The essential idea of the invention is that in a separate reactor whereinto calcium oxide containing flue gases are conducted, water is injected thereinto in the form of an alkaline sodium-containing solution, that is, preferably as an aqueous solution of sodium hydroxide or sodium hydroxide and sodium carbonate, so that the sodium-containing solution reacts with sulfur oxides and the solid particles produced as a result of the reaction of sulfur and sodium as well as calcium are removed from the reactor in a dry dust-like form, whereafter they can be separated with an electrostatic precipitator from the flue gases and returned to the reaction process wherein water and a requisite quantity of so-called make-up sodium are mixed with the removed dust-like particles in a mixing tank wherein a sodium hydroxide solution is again formed therefrom, whereafter the solids-containing sodium hydroxide solution is filtered to remove the solids from the solution, and the sodium hydroxide is re-injected into the reactor.

BRIEF DESCRIPTION OF THE DRAWINGS

The invention will be explained more closely in the accompanying drawings wherein

FIG. 1 shows a boiler 1 to which calcium carbonate is supplied, said calcium carbonate decomposing in the boiler into calcium oxide and reacting with sulfur oxides, thus diminishing the sulfur content of the flue gases already at this stage. The flue gases which still contain unreacted calcium oxide and sulfur oxides are conveyed through conduit 2 into a desulfurization reactor 3 wherein a sodium hydroxide solution is injected into the flue gases. Alternatively, a solution containing both sodium hydroxide and sodium carbonate dissolved in water can be injected. In the reactor, the sodium present in the sodium-containing alkaline solution reacts with sulfur oxides, and the water present in the sodium-containing solution reacts with CaO, forming $Ca(OH)_2$ which also further reacts with sulfur oxides, the result being solid reaction products which are formed into a dry dust-like solid by the action of the heat of the flue gas. From reactor 3, the flue gases and the reaction products therein are conveyed through conduit 4 into an electrostatic precipitator 5 wherein the dust-like reaction products, such as $Na_2SO_3$, $Na_2SO_4$, CaO, $CaSO_3$ and $CaSO_4$, are separated from the flue gas simultaneously as fly ash is separated. The flue gases are further conveyed through conduit 6 into the ambient air, and the dust-like reaction products are conveyed into a mixing tank 7 whereinto water and the requisite quantity of sodium in a suitable form, such as $Na_2CO_3$, NaOH, are added. The tank 7 includes a mixer 8 wherewith the dry solids and liquid are intermixed, in which connection they react with each other in the aqueous solution so that reaction products in solid form and additionally a sodium hydroxide solution are produced. This admixture is further conveyed through duct 9 into a filter 10 wherein the solid reaction products are separated from the sodium hydroxide solution and removed as a relatively dry mass or more or less as a cake, simultaneously as the sodium hydroxide is conveyed via duct 11 through nozzle 11a into the reactor 3 for injection. Part of the sodium solution is conveyed through duct 12 back into the mixing tank 7 in order that the fly ash and other solids may be suspended effectively enough and the reactions carried out as well as possible.

Many kinds of reactions occur in the mixing tank 7, since several different substances participate in the reaction. The calcium oxide discharged from the electrostatic precipitator forms calcium hydroxide with water as follows:

$$CaO + H_2O \rightarrow Ca(OH)_2$$

This again reacts with the possible sodium carbonate, forming sodium hydroxide and calcium carbonate as follows:

$$Na_2CO_3 + Ca(OH)_2 \rightarrow 2NaOH + CaCO_3$$

Sodium hydroxide, sodium carbonate or sodium bicarbonate ($NaHCO_3$) may be added as make-up sodium.

Reactions of sodium bicarbonate:

$$NaHCO_3 + Ca(OH)_2 \longrightarrow Na_2SO_3 + CaSO_3 \cdot \tfrac{1}{2}H_2O \downarrow + 3/2 H_2O$$

$$Na_2SO_3 + Ca(OH)_2 + \tfrac{1}{2}H_2O \longrightarrow 2NaOH + CaSO_3 \cdot \tfrac{1}{2}H_2O \downarrow ,$$

i.e. the final result is sodium hydroxide.

The following reactions take place in the mixing tank, the result of said reactions being mainly an aqueous solution of sodium hydroxide and solid reaction products:

$$Na_2CO_3 + 2SO_2 + H_2O \longrightarrow 2NaHSO_3 + CO_2 \uparrow$$

$$Na_2CO_3 + Ca(OH)_2 \longrightarrow 2NaOH + CaCO_3 \downarrow$$

$$Ca(OH)_2 + 2NaHSO_3 \longrightarrow$$

$$Na_2SO_3 + CaSO_3 \cdot \tfrac{1}{2}H_2O \downarrow + 3/2\, H_2O$$

$$Ca(OH)_2 + Na_2SO_3 + \tfrac{1}{2}H_2O \longrightarrow 2NaOH + CaSO_3 \cdot \tfrac{1}{2}H_2O \downarrow$$

$$2Na_2SO_3 + O_2 \longrightarrow 2Na_2SO_4$$

$$Ca(OH)_2 + Na_2SO_4 + 2H_2O \longrightarrow 2NaOH + CaSO_4 \cdot 2H_2O \downarrow$$

$$CaCO_3 + 2NaHSO_3 \longrightarrow$$

$$Na_2SO_3 + CaSO_3 \cdot \tfrac{1}{2}H_2O \downarrow + CO_2 \uparrow + \tfrac{1}{2}H_2O$$

$$(x+y)CaCO_3 + xNa_2SO_4 + (x+y)NaHSO_3 + zH_2O \longrightarrow$$

$$(x+y)NaHCO_3 + xCaSO_4\, yCaSO_3 \cdot zH_2O \downarrow + xNa_2SO_3$$

The NaOH filtrate conveyed from the mixing tank into the filter and further exiting the filter does not contain any substantial quantity of lime, since the calcium oxide conveyed from the electrostatic precipitator into the mixing tank 7 together with the ash reacts therein and is discharged out from the filter together with the cake. The required sodium make-up addition into the mixing tank 7 is rather small, since the quantity of sodium removed with the cake is rather small. Normally, about 1% by weight on the weight of the cake is removed together with the cake, when the dry solids content of the cake is about 56%. Likewise, the quantity of the additional water supply is rather small, since the quantity of evaporated water exiting together with the flue gases and the quantity of water removed from the filter together with the cake are compensated therewith. Part of the water quantity, or even the entire additional water, is supplied to the filter 10 as washing water for the cake.

Figure 1:
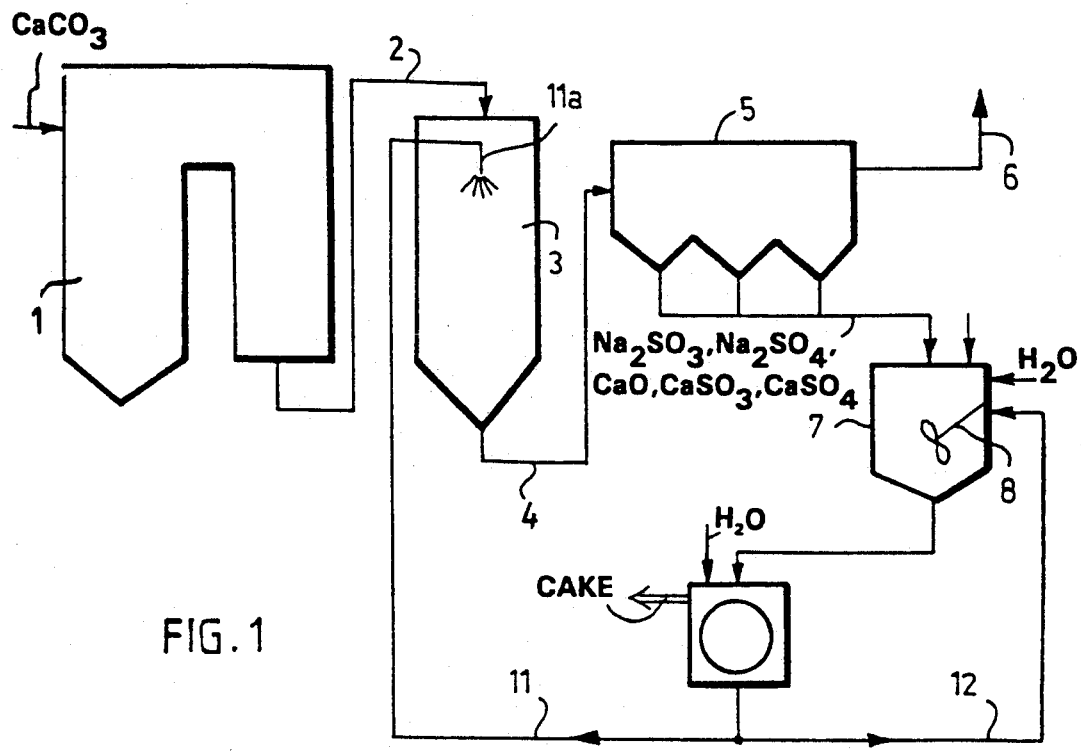
FIG. 1 shows schematically an apparatus realizing the process of the invention.
Figure 2:
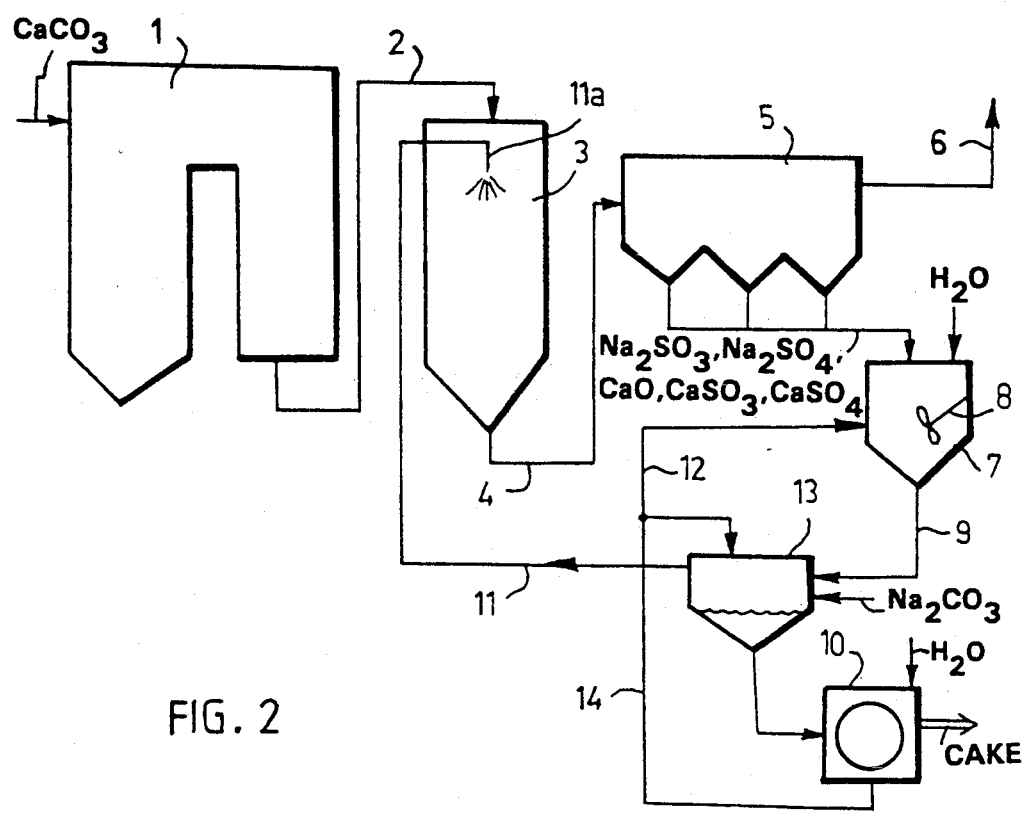
FIG. 2 shows an advantageous embodiment of the invention.

FIG. 2 depicts another practical embodiment of the invention, wherein the admixture of NaOH and solids issuing from the mixing tank 7 is conveyed through duct 9 into a thickener 13 wherein the slurry is thickened and wherefrom it is further conveyed into the filter 10 in which the solids are removed in cake form simultaneously as the cake is washed with additional water and the filtrate is conveyed through duct 14 back into the thickener. From the thickener 13, the produced NaOH is conveyed in the manner shown in FIG. 1 through duct 11 into the desulfurization reactor 3.

In addition to a sodium-containing solution, also hydrogen peroxide may be mixed with the injection water, and therewith the desulfurization can still be enhanced, which may be necessary under certain conditions. Hydrogen peroxide ($H_2O_2$) will very strongly oxidize sulfur dioxide, forming sulfuric acid which again reacts very vigorously with lime, and thus the binding of sulfur to lime is enhanced and proportionally a smaller quantity of sulfur remains for removal in the other stages of the process.

The advantage of the invention lies in that the desulfurization can be performed effectively and in a rather simple manner, since part of the sulfur leaves through the boiler as a result of the reactions of the lime—usually calcium carbonate—supplied, and the majority of the remaining sulfur oxides can be removed in the desulfurization reactor by simply utilizing a sodium hydroxide solution so that the result is a dry dust-like reaction product which is easy to remove with an electrostatic precipitator and wherefrom a new NaOH solution is again obtained with a rather simple process, while the formed solids can be easily removed from the process. The advantage to be achieved with the solution according to the invention is preeminently a result of the fact that a sodium-containing alkaline solution is considerably more reactive than mere water in the dampening of flue gases and lime carried therein, which entails that compared with the use of water, a considerably higher desulfurization effect is achieved with a sodium-containing dampening solution under the same conditions.

The invention has been disclosed hereinabove in the specification and drawings schematically by way of example, and it is not bound thereto in any way. Sodium hydroxide may be injected into the desulfurization reactor from one or more separate points, likewise as it is possible to inject it downward or upward depending on how one wishes to conduct the stream of flue gas in the reactor. Instead of an electrostatic precipitator, also other filters wherewith the dry dust-like material can be removed from the flue gases and the NaOH returned to regeneration in the mixing reactor may in principle be used.

I claim:

1. A process for the removal of sulfur oxides from flue gases, wherein
   (a) lime is fed into the flue gases in which it reacts with the sulfur oxides forming a solid dust-like reaction product,
   (b) water as a sodium-containing alkaline solution is injected into the calciferous flue gases still containing sulfur oxides to enhance the reaction, whereupon the sodium will react with the sulfur oxides so that the reaction produces dust-like solids,
   (c) the dust-like solids resulting from the reactions are removed form the flue gases with a filter,
   (d) at least water and sodium compounds are mixed with the dust-like solids separated from the flue gases so as to form an admixture wherein lime, sulfur and part of the sodium react, forming new solid reaction products, and the remainder of the sodium forms sodium hydroxide with the water,
   (e) the solids are filtered from the produced admixture and
   (f) at least part of the sodium hydroxide solution in the form of a filtrate is recycled for injection into the flue gases,
   wherein the amount of sodium compounds in the sodium-containing alkaline solution of step (b) is sufficient, in conjunction with the lime added in step (a), to convert the sulfur oxides originally present in the flue gases into solid reaction products and the amount of sodium compounds added in step (d) is sufficient to replenish the sodium-containing alkaline solution in step (b) by recycling the filtrate in step (f).

2. A process as claimed in claim 1, wherein part of the filtered sodium hydroxide solution is recycled and mixed with the solids to suspend them into a slurry of a suitable thickness.

3. A process as claimed in claim 1, wherein the admixture of solids and liquid is first thickened by separating part of the sodium hydroxide solution therefrom, and substantially the remainder of the sodium hydroxide solution is separated from the thickened slurry by filtration.

4. A process as claimed in claim 1, wherein at least part of the additional sodium is supplied as sodium carbonate.

5. A process as claimed in claim 1, wherein at least part of the additional sodium is supplied as sodium hydroxide.

6. A process as claimed in claim 1, wherein at least part of the additional sodium is supplied as sodium bicarbonate.

7. A process as claimed in claim 1, wherein hydrogen peroxide is added to the injection solution.

8. A process as claimed in claim 1, wherein the injection solution is supplied to the flue gases as a sodium hydroxide solution only.

9. A process as claimed in claim 1, wherein the injection solution is supplied to the flue gases as a sodium hydroxide—sodium carbonate solution.

* * * * *